BYRON W. NICHOLS, OF CANTON, OHIO, ASSIGNOR TO HIMSELF, CORNELIUS AULTMAN, GEORGE H. BUCKINS, PERCY S. SOWERS, AND A. CLARK TONNER, OF THE SAME PLACE.

Letters Patent No. 89,329, dated April 27, 1869.

IMPROVED MODE OF CONVERTING ARTICLES OF IRON INTO STEEL.

The Schedule referred to in these Letters Patent and making part of the same.

*To all whom it may concern:*

Be it known that I, BYRON W. NICHOLS, of Canton, in the county of Stark, and State of Ohio, have invented a new and useful Improvement in Converting Iron Articles into Steel; and I do hereby declare that the following is a full, clear, and exact description thereof.

I take black oxide of manganese, peroxide of iron, and common resin, or their chemical equivalents, in about the following proportions, viz:

Twenty-five parts black oxide of manganese, fifteen parts peroxide of iron, and sixty parts (by weight) of common resin.

I grind or pulverize the manganese, oxide of iron, and resin to a powder, and intimately mix them. I then put the whole into a suitable vessel, and apply a gentle heat, sufficient to melt the resin, making a semi-fluid mass of the whole. I then take the articles I wish to convert, and dip them into the melted compound, leaving a coating of the compound adhering to the articles, to the thickness of about one-sixteenth of an inch, after which I put the articles thus coated into saggers or suitable annealing-cases, surrounded with pulverized charcoal. I then seal the annealing-cases with fire-clay or other suitable material, to exclude the air as perfectly as possible, and submit them to a red heat, in an annealing-kiln or oven, for from one to ten hours, according to the thickness of the articles to be converted.

I am aware that manganese and peroxide of iron have been known and used as a flux in making cast-iron and steel from the ores, and from molten cast-iron; but I am not aware that either of these substances has been heretofore used in any process for converting articles previously cast or wrought into shape for implements, tools, &c.

Having thus described the nature and operation of my improvement,

What I claim as my invention, is—

1. The use of the ingredients herein named, when compounded and used in the manner and in about the proportions herein described, and for the purpose set forth.

2. The employment of the peroxides of manganese and iron in the process of converting into steel articles of iron that have previously been cast or wrought into the desired form for use.

BYRON W NICHOLS. [L. S.]

Witnesses:
ERASTUS KIES, [L. S.]
A. J. UNDERHILL. [L. S.]